United States Patent
Gong

(10) Patent No.: US 11,538,208 B2
(45) Date of Patent: Dec. 27, 2022

(54) PICTURE GENERATION METHOD AND DEVICE, STORAGE MEDIUM, AND ELECTRONIC DEVICE

(71) Applicant: Tencent Technology (Shenzhen) Company Limited, Shenzhen (CN)

(72) Inventor: Xiaobo Gong, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 100 days.

(21) Appl. No.: 17/081,551

(22) Filed: Oct. 27, 2020

(65) Prior Publication Data

US 2021/0074046 A1  Mar. 11, 2021

Related U.S. Application Data

(63) Continuation of application No. PCT/CN2019/103510, filed on Aug. 30, 2019.

(30) Foreign Application Priority Data

Sep. 3, 2018 (CN) .......................... 201811019688.2

(51) Int. Cl.
*G06T 11/60* (2006.01)
*G06K 9/62* (2022.01)
(Continued)

(52) U.S. Cl.
CPC ............ *G06T 11/60* (2013.01); *G06K 9/6201* (2013.01); *G06K 9/6256* (2013.01); *G06V 10/26* (2022.01);
(Continued)

(58) Field of Classification Search
None
See application file for complete search history.

(56) References Cited

U.S. PATENT DOCUMENTS 10,552,977 B1 * 2/2020 Theis .................... G06T 11/001
2012/0327265 A1 * 12/2012 Arujunan ........... H04N 1/00307
348/E5.031
(Continued)

FOREIGN PATENT DOCUMENTS

CN    107527318   * 12/2017
CN    107527318 A   12/2017
(Continued)

OTHER PUBLICATIONS

International Search Report and Written Opinion with English Translation for International Application No. PCT/CN2019/103510 dated Nov. 2, 2019; 12 pages.
(Continued)

*Primary Examiner* — David H Chu
(74) *Attorney, Agent, or Firm* — Crowell & Moring LLP

(57) ABSTRACT

This disclosure relates to a picture generation method and device, a storage medium, and an electronic device. The method includes: obtaining a source portrait picture displaying a target object; cropping the source portrait picture to obtain a face region picture corresponding to a face of the target object excluding a hair portion; inputting the face region picture to a picture generation model to obtain an output result of the picture generation model, the picture generation model being obtained after machine learning training through an adversarial neural network model by using a plurality of sample pictures; and generating a target portrait picture by using the output result of the picture generation model, the target portrait picture displaying a target hairstyle matching the face of the target object. This disclosure resolves the technical problem that pictures generated in related art cannot achieve an effect expected by a user and other technical problems.

20 Claims, 6 Drawing Sheets

(51) Int. Cl.
*G06V 40/16* (2022.01)
*G06V 10/26* (2022.01)

(52) U.S. Cl.
CPC ........ *G06V 40/168* (2022.01); *G06T 2210/22* (2013.01)

(56) References Cited

U.S. PATENT DOCUMENTS

| | | | | |
|---|---|---|---|---|
| 2013/0129210 | A1* | 5/2013 | Na | G06Q 30/02 |
| | | | | 382/165 |
| 2014/0176565 | A1* | 6/2014 | Adeyoola | G06F 3/04817 |
| | | | | 345/473 |
| 2017/0213112 | A1 | 7/2017 | Sachs et al. | |
| 2017/0330380 | A1* | 11/2017 | Ahn | G06F 3/16 |
| 2017/0344860 | A1 | 11/2017 | Sachs et al. | |
| 2019/0206101 | A1* | 7/2019 | De la Torre | G06T 11/60 |
| 2019/0266807 | A1* | 8/2019 | Lee | G06T 13/40 |
| 2020/0193503 | A1* | 6/2020 | Mathiaszyk | A45D 44/005 |

FOREIGN PATENT DOCUMENTS

| | | |
|---|---|---|
| CN | 107862334 A | 3/2018 |
| CN | 108389077 A | 8/2018 |
| CN | 108446697 A | 8/2018 |
| CN | 109447895 A | 3/2019 |

OTHER PUBLICATIONS

Office Action for Chinese Patent Application No. 201811019688.2 dated May 8, 2020; 6 pages.

Chinese Office Action with English Concise Explanation of Relevance for Chinese Office Action for Patent Application No. CN201811019688.2 dated Nov. 27, 2020; 6 pages.

* cited by examiner

PICTURE GENERATION METHOD AND DEVICE, STORAGE MEDIUM, AND ELECTRONIC DEVICE

RELATED APPLICATION

This application is a continuation application of the International PCT Application No. PCT/CN2019/103510, filed with the China National Intellectual Property Administration, PRC on Aug. 30, 2019 which claims priority to Chinese Patent Application No. 201811019688.2, entitled "PICTURE GENERATION METHOD AND DEVICE, STORAGE MEDIUM, AND ELECTRONIC DEVICE" and filed with the China National Intellectual Property Administration, PRC on Sep. 3, 2018, both of which are incorporated herein by reference in their entireties.

FIELD OF THE TECHNOLOGY

This disclosure relates to the field of computer technologies, and specifically to an image processing technology.

BACKGROUND OF THE DISCLOSURE

In many terminal applications for editing pictures, image elements included in the pictures often need to be adjusted. For example, a combination of different image elements may be adjusted to synthesize a new picture. To simplify steps of synthesis, the terminal applications usually combine and splice different image elements directly in a simple manner. For example, when editing is performed for a hairstyle in a portrait picture, different types of hairstyles may be pasted directly near the face of a same object, thereby generating pictures with different hairstyles for the object.

However, in picture generation methods provided in the related technologies, it is usually a user that selects from various hairstyles, a hairstyle matching an object in a picture, and the user further needs to keep switching to view effects of the various hairstyles and finally make a decision. The operation is cumbersome, and it is difficult for the user to remember a hairstyle that has been selected. In this case, the user often performs multiple operations and may not be able to determine a most suitable hairstyle. As such, a best solution may not be selected quickly, resulting in poor user experience. Meanwhile, a system needs to respond to multiple invalid operations, resulting in a waste of system resources.

SUMMARY

Embodiments of this disclosure provide a picture generation method and device, a storage medium, and an electronic device to simplify user operations and help users to quickly generate needed pictures having synthesized hairstyles, so that a utilization rate of system resources can be improved to some extent.

According to one aspect of the embodiments of this disclosure, a picture generation method is provided. The method is applied to user equipment, and includes: obtaining a source portrait picture displaying a target object; cropping the source portrait picture to obtain a face region picture corresponding to the face of the target object excluding a hair portion; inputting the face region picture into a picture generation model to obtain an output result of the picture generation model, the picture generation model being obtained after machine learning training through an adversarial neural network model by using a plurality of sample pictures; and generating a target portrait picture by using the output result of the picture generation model, the target portrait picture displaying a target hairstyle matching the face of the target object.

According to another aspect of the embodiments of this disclosure, a picture generation device is provided, including: a first obtaining unit, configured to obtain a source portrait picture displaying a target object; a cropping unit, configured to crop the source portrait picture to obtain a face region picture corresponding to the face of the target object excluding a hair portion; an input unit, configured to input the face region picture into a picture generation model to obtain an output result of the picture generation model, the picture generation model being obtained after machine learning training through an adversarial neural network model by using a plurality of sample pictures; and a generation unit, configured to generate a target portrait picture by using the output result of the picture generation model, the target portrait picture displaying a target hairstyle matching the face of the target object. In this disclosure, a unit and a module may be hardware such as a combination of electronic circuitries; firmware; or software such as computer instructions. The unit and the module may also be any combination of hardware, firmware, and software. In some implementation, a unit may include at least one module.

In one implementation, the input unit includes an extraction module and a first obtaining module.

In another implementation, the first obtaining module includes: a determining submodule, configured to determine a set of candidate hairstyles according to the facial feature of the target object; and a first obtaining submodule, configured to obtain, from the set of candidate hairstyles, a hairstyle having the highest matching degree with the facial feature of the target object as the target hairstyle.

In another implementation, the generation unit includes: a substitution submodule, configured to substitute the target hairstyle for an original hairstyle of the target object in the source portrait picture to generate the target portrait picture.

In another implementation, the device further includes a second obtaining unit and a training unit.

In another implementation, the second obtaining unit includes: a second obtaining module, configured to obtain a set of valid sample pictures matching a keyword from a network, the keyword may be used for indicating a hot or trending topic; and a first determining module, configured to use valid sample pictures in the set of valid sample pictures as the plurality of sample pictures for training the adversarial neural network model.

In another implementation, the training unit includes the following modules and is configured to repeatedly perform operations performed by the following modules until an output result of the generation network model in the adversarial neural network model converges to a predetermined threshold: a first training module, configured to train the determining network model in the adversarial neural network model until a converged determining network model is obtained; a second training module, configured to train the generation network model by using the converged determining network model until a converged generation network model is obtained; a third training module, configured to train the determining network model continuously by using the converged generation network model in a case that the output result of the converged generation network model does not converge to the predetermined threshold; and a second determining module, configured to use the converged generation network model as the picture generation model in a case that the output result of the converged generation network model converges to the predetermined threshold.

In another implementation, the first training module includes the following submodules and is configured to repeatedly perform operations performed by the following submodules until the converged determining network model is obtained: a second obtaining submodule, configured to obtain a first current-sample source portrait picture displaying a first sample object; a first cropping submodule, configured to crop the first current-sample source portrait picture to obtain a first sample face region picture corresponding to the face of the first sample object; a first input submodule, configured to input the first sample face region picture into the generation network model to generate a first current-sample target portrait picture of the first sample object; a second input submodule, configured to input a first sample pair including the first sample face region picture and the first current-sample source portrait picture and a second sample pair including the first sample face region picture and the first current-sample target portrait picture to the determining network model for training; a third obtaining submodule, configured to obtain a next sample source portrait picture displaying the first sample object as the first current-sample source portrait picture in a case that the output result of the determining network model does not converge; and a fourth obtaining submodule, configured to obtain the converged determining network model in a case that the output result of the determining network model converges.

In another implementation, the second training module includes the following submodules and is configured to repeatedly perform operations performed by the following submodules until the converged generation network model is obtained: a fifth obtaining submodule, configured to obtain a second current-sample source portrait picture displaying a second sample object; a second cropping submodule, configured to crop the second current-sample source portrait picture to obtain a second sample face region picture corresponding to the face of the second sample object; a third input submodule, configured to input the second sample face region picture into the generation network model to generate a second current-sample target portrait picture of the second sample object; a fourth input submodule, configured to input a third sample pair including the second sample face region picture and the second current-sample source portrait picture and a fourth sample pair including the second sample face region picture and the second current-sample target portrait picture to the converged determining network model; a sixth obtaining submodule, configured to obtain a next sample source portrait picture displaying the second sample object as the second current-sample source portrait picture in a case that the output result of the converged determining network model indicates that the generation network model does not converge; and a seventh obtaining submodule, configured to obtain the converged generation network model in a case that the output result of the converged determining network model indicates that the generation network model converges.

According to another aspect of the embodiments of this disclosure, an apparatus for picture generation is provided. The apparatus includes a memory for storing computer instructions; and a processor in communication with the memory. When the processor executes the computer instructions, the processor is configured to cause the apparatus to: obtain a source portrait picture displaying a target object; crop the source portrait picture to obtain a face region picture corresponding to a face of the target object excluding a hair portion; input the face region picture to a picture generation model to obtain an output result of the picture generation model, the picture generation model being obtained after machine learning training through an adversarial neural network model by using a plurality of sample pictures; and generate a target portrait picture by using the output result of the picture generation model, the target portrait picture displaying a target hairstyle matching the face of the target object.

According to still another aspect of the embodiments of this disclosure, a non-transitory computer-readable storage medium is further provided. The non-transitory storage medium stores a computer program, the computer program being set to perform, when run, the picture generation method.

According to still another aspect of the embodiments of this disclosure, an electronic device is further provided, including a memory, a processor, and a computer program that is stored on the memory and that may be run on the processor, the processor being configured to perform, through the computer program, the foregoing picture generation method.

In the picture generation method is provided in the embodiments of this disclosure, a source portrait picture displaying a target object is obtained; the source portrait picture is cropped to obtain a face region picture corresponding to the face of the target object; the face region picture is inputted into a picture generation model to obtain an output result of the picture generation model, the picture generation model being obtained after machine learning training through an adversarial neural network model by using a plurality of sample pictures; and a target portrait picture is generated by using the output result of the picture generation model, the target portrait picture displaying a target hairstyle matching the face of the target object. In the foregoing method, after a face region picture is obtained by cropping a source portrait picture, the face region picture is inputted into the adversarial neural network model that has been trained, and the adversarial neural network model generates a target portrait picture displaying a target hairstyle matching the face of a target object, so that a user no longer needs to manually generate a target portrait picture by performing hairstyle matching a plurality of times according to personal aesthetics, thereby improving efficiency of generating the target portrait picture, helping the user quickly determine an optimal solution, and improving user experience.

BRIEF DESCRIPTION OF THE DRAWINGS

The accompanying drawings, which are incorporated herein and constitute a part of this specification, illustrate embodiments consistent with this disclosure and, together with the specification, serve to explain the principles of this disclosure.

DESCRIPTION OF EMBODIMENTS

To make solutions of this disclosure more comprehensible for a person skilled in the art, the technical solutions in the embodiments of this disclosure are clearly and completely described below with reference to the accompanying drawings in the embodiments of this disclosure. Apparently, the described embodiments are merely some rather than all of the embodiments of this disclosure. All other embodiments obtained by a person skilled in the art based on the embodiments of this disclosure without creative efforts shall fall within the protection scope of this disclosure.

The terms such as "first" and "second" in the specification, claims, and foregoing accompanying drawings of this disclosure are intended to distinguish between similar objects rather than describe a particular sequence or a chronological order. It is to be understood that the data termed in such a way is interchangeable in proper circumstances, so that the embodiments of this disclosure described herein can be implemented in other orders than the orders illustrated or described herein. Moreover, the terms "include", "have", and any other variations mean to cover the non-exclusive inclusion. For example, a process, method, system, product, or device that includes a list of steps or units is not necessarily limited to those expressly listed steps or units, but may include other steps or units not expressly listed or inherent to such a process, method, system, product, or device.

Figure 1:
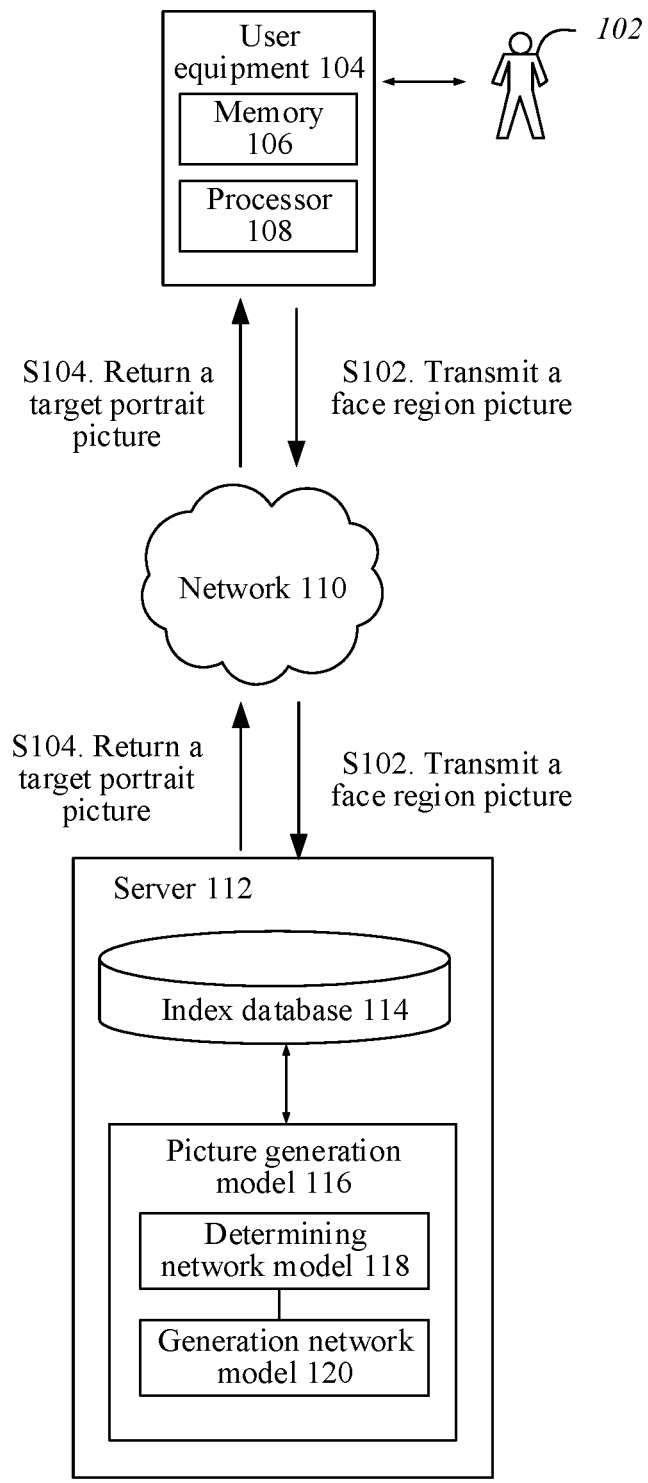
FIG. 1 is a schematic diagram of an exemplary application environment of an optional picture generation method according to an embodiment of this disclosure.

According to one aspect of the embodiments of this disclosure, a picture generation method is provided as an optional implementation. The foregoing picture generation method may be applied to, but not limited to, an application environment shown in FIG. 1.

A user 102 may perform human-computer interaction with user equipment 104. The user equipment 104 includes a memory 106 and a processor 108. The user equipment 104 obtains a source portrait picture displaying a target object and crops the source portrait picture to obtain a face region picture corresponding to the face of the target object. Through step S102, the user equipment 104 transmits the obtained face region picture to a server 112 through a network 110. The server 112 includes an index database 114 and a picture generation model 116, the picture generation model 116 including a determining network model 118 and a generation network model 120. The picture generation model 116, after obtaining the face region picture, generates a target portrait picture based on the face region picture, and transmits, through step S104, the target portrait picture to the user equipment 104 through the network 110.

In a practical application, a user often manually selects a hairstyle to replace a current hairstyle of an object in a picture according to personal aesthetics, and there is no guarantee that the object in the generated picture matches the selected hairstyle. However, in this embodiment, after a face region picture is obtained by cropping a source portrait picture, the face region picture is inputted to an adversarial neural network model that has been trained, and the adversarial neural network model generates a target portrait picture displaying a target hairstyle matching the face of a target object, so that a user no longer needs to manually generate a target portrait picture by performing hairstyle matching multiple times according to personal aesthetics, thereby improving efficiency of generating the target portrait picture, helping the user quickly determine an optimal solution, and improving user experience. Optionally, the foregoing picture generation method may be applied to, but not limited to, terminals that can perform computing of data, for example, terminals such as a mobile phone, a tablet computer, a laptop computer, and a PC. The network may include, but is not limited to, a wireless network or a wired network. The wireless network includes: a wireless fidelity (Wi-Fi) network and other networks implementing wireless communication. The wired network may include, but is not limited to: a wide area network, a metropolitan area network, and a local area network. The server may include, but is not limited to, any hardware device that may perform computing.

Figure 2:
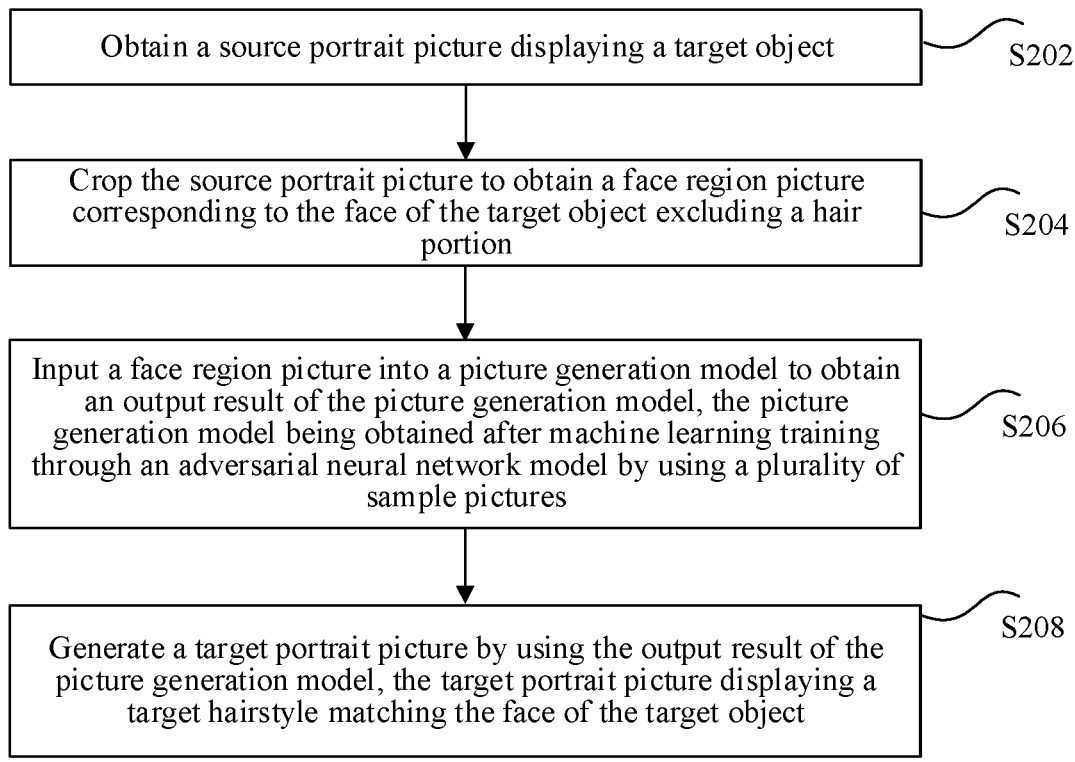
FIG. 2 is a schematic flowchart of an optional picture generation method according to an embodiment of this disclosure.

Optionally, in an optional implementation, as shown in FIG. 2, the picture generation method includes the following steps:

S202. Obtain a source portrait picture displaying a target object.

S204. Crop the source portrait picture to obtain a face region picture corresponding to the face of the target object.

S206. Input the face region picture into a picture generation model to obtain an output result of the picture generation model, the picture generation model being obtained after machine learning training through an adversarial neural network model by using a plurality of sample pictures.

S208. Generate a target portrait picture by using the output result of the picture generation model, the target portrait picture displaying a target hairstyle matching the face of the target object.

Optionally, the picture generation method may be applied to, but limited to, the field of wedding photo retouching, a camera of a mobile terminal, or the field of beautifying identity photos.

Optionally, the face region picture may be, but is not limited to, a picture of the face remaining after the head hair of the target object in the source portrait picture is cropped. In this disclosure, hair is also used to refer to head hair for simplicity.

Figure 3:
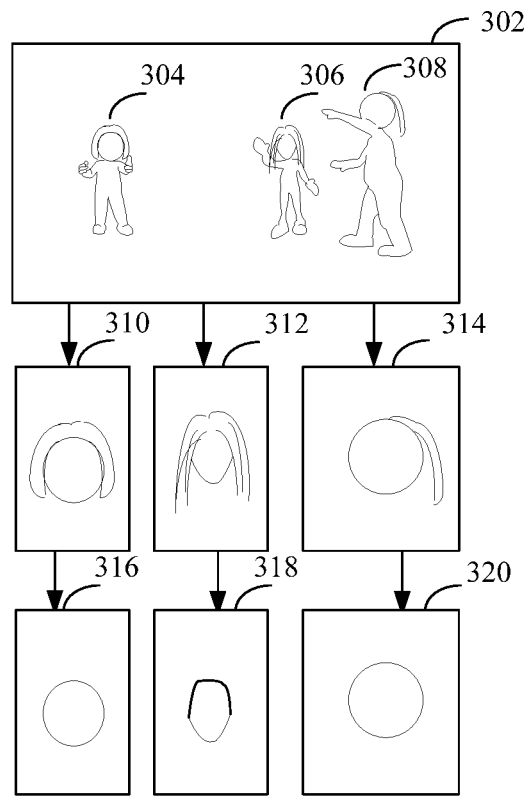
FIG. 3 is a schematic diagram of an optional picture generation method according to an embodiment of this disclosure.

Descriptions are provided in the following with reference to FIG. 3. As shown in FIG. 3, 302 is an optional source portrait picture, and the source portrait picture includes three target objects: a target object 304, a target object 306, and a target object 308. The face 310 of the target object 304, the face 312 of the target object 306, and the face 314 of the target object 308 are extracted. For the face of each target object, cropping is performed to generate a face region picture corresponding to the face of the each target object. The hair of the face region picture is removed. Therefore, a face region picture 316, a face region picture 318, and a face region picture 320 are obtained. Descriptions are provided in the following with reference to FIG. 4. After the face region picture 318 is obtained by performing cropping for the face 312 of the target object, the face region picture 318 is inputted to the picture generation model to obtain the face 402 with a changed hairstyle.

In this embodiment, after a face region picture is obtained by cropping a source portrait picture, the face region picture is inputted into the adversarial neural network model that has been trained, and the adversarial neural network model generates a target portrait picture displaying a target hairstyle matching the face of a target object, so that a user no longer needs to manually generate a target portrait picture by performing hairstyle matching multiple times according to personal aesthetics, thereby improving efficiency of generating the target portrait picture, helping the user quickly determine an optimal solution, and improving user experience.

Optionally, the cropping the source portrait picture to obtain a face region picture corresponding to the face of the target object includes the following steps:

(1) Crop the source portrait picture to obtain the face region picture if the source portrait picture includes one target object.

(2) Crop the source portrait picture to obtain a face region picture corresponding to the face of each target object if the source portrait picture includes a plurality of target objects.

Optionally, if the source portrait picture includes a plurality of target objects, the plurality of target objects may be first cropped and divided to obtain a plurality of portrait pictures, each portrait picture including a target object, and then, a cropping step is performed on the each portrait picture, to obtain a face region picture corresponding to the each target object, the hair of the face region picture is removed.

As shown in FIG. 3, the source portrait picture in FIG. 3 includes three target objects. When the source portrait picture is cropped, the source portrait picture is first cropped into three portrait pictures, each portrait picture including a target object, and then, the each portrait picture is cropped, so that a plurality of face region pictures are obtained.

Alternatively, if the portrait picture includes a plurality of target objects, cropping may be performed at one time for all the target objects, to obtain a plurality of face region pictures.

For example, if the source portrait picture includes three target objects, cropping may be performed for the faces of all target objects at one time to obtain three face region pictures, the three face region pictures respectively corresponding to the faces of the three target objects.

Optionally, after obtaining a face region picture and inputting the face region picture to a picture generation model to obtain an output result of the picture generation model, the method includes: extracting, through an encoding module in the picture generation model, a facial feature matching the face of the target object from the face region picture; and obtaining, through a decoding module in the picture generation model, the target hairstyle matching the facial feature of the target object. Correspondingly, generating a target portrait picture by using the output result of the picture generation model includes: substituting an original hairstyle of the target object in the source portrait picture with the target hairstyle to generate the target portrait picture.

Optionally, the encoding module may extract a facial feature matching the face of the target object by, but not limited to, identifying a color of each pixel in the face region picture.

Optionally, the decoding module may generate, but not limited to, a plurality of hairstyles, and select one of the plurality of hairstyles as the target hairstyle.

Optionally, the obtaining, through a decoding module, the target hairstyle matching the facial feature of the target object includes: determining a set of candidate hairstyles according to the facial feature of the target object; and obtaining, from the set of candidate hairstyles, a hairstyle having the highest matching degree with the facial feature of the target object as the target hairstyle.

Optionally, when the picture generation model obtains output results, each output result carries a probability greater than or equal to zero and less than or equal to 1. The probability may be expressed in a fraction or a decimal. A higher probability indicates a more realistic display effect of the output result. When the picture generation model obtains the output result, the probability in the output result may be used as a matching degree.

Optionally, after the set of candidate hairstyles is obtained, the hairstyles in the set of candidate hairstyles may be sorted according to, but not limited to, a matching degree with the facial feature of the target object. A higher matching degree indicates that the hairstyle ranks higher.

Optionally, before obtaining a source portrait picture displaying a target object, the method further includes: obtaining a plurality of sample pictures; training the adversarial neural network model by using the plurality of sample pictures, the adversarial neural network model including: a generation network model matching the picture generation model, and a determining network model configured to determine a generation result of the generation network model.

Optionally, the sample pictures may be, but not limited to, obtained by directly downloading public pictures, or obtained through a crawling means.

Optionally, the sample pictures may be, but not limited to, obtained from a set of valid sample pictures found through searching by inputting a keyword. Optionally, the keyword may be, but is not limited to, any descriptive words, such as handsome man, beautiful woman, long hair, and short hair. For example, after a keyword such as short hair is received, a set of valid sample pictures may be obtained through search, and the set of valid sample pictures includes valid sample pictures corresponding to short hair. Further, the valid sample pictures in the obtained set of valid sample pictures may be used as sample pictures for training the adversarial neural network model.

Optionally, the adversarial neural network model includes a generation network model and a determining network model.

Optionally, training the adversarial neural network model may include, but is not limited to, the following steps:

S1. Train the determining network model in the adversarial neural network model until a converged determining network model is obtained.

S2. Train the generation network model by using the converged determining network model until a converged generation network model is obtained.

S3. Train the determining network model continuously by using the converged generation network model when the output result of the converged generation network model does not converge to the predetermined threshold.

S4. Use the converged generation network model as the picture generation model in a case that the output result of the converged generation network model converges to the predetermined threshold.

S5. Perform S1 to S4 repeatedly until an output result of the generation network model in the adversarial neural network model converges to a predetermined threshold.

Optionally, the predetermined threshold may be, but is not limited to, a preset value. The predetermined threshold may be greater than or equal to zero and less than or equal to 1. For example, if the predetermined threshold is 0.5, then the output result converges to the predetermined threshold may be, but is not limited to, that the output result be greater than or equal to 0.5. After the generation network model obtains the output result, the converged determining network model is configured to determine the obtained output result. If it is determined that the output result is less than 0.5, the converged determining network model and the converged generation network model are continuously trained. If it is determined that the output result is greater than 0.5, the converged generation network model is determined as the picture generation model, and the face region picture is processed by using the picture generation model to obtain the target portrait picture.

Optionally, the determining network model may be trained through, but not limited to, the following step: performing following steps repeatedly until the converged determining network model is obtained: obtaining a first current-sample source portrait picture displaying a first sample object; cropping the first current-sample source portrait picture to obtain a first sample face region picture corresponding to the face of the first sample object; inputting the first sample face region picture to the generation network model to generate a first current-sample target portrait picture of the first sample object; inputting a first sample pair including the first sample face region picture and the first current-sample source portrait picture and a second sample pair including the first sample face region picture and the first current-sample target portrait picture to the determining network model for training; obtaining a new sample source portrait picture displaying the first sample object to be used as the first current-sample source portrait picture if the output result of the determining network model does not converge; and using the converged determining network model as the trained determining network model if the output result of the determining network model converges.

Optionally, when determining network model converges, the training the generation network model by using the converged determining network model may include, but is not limited to, the following step: performing following steps repeatedly until the converged generation network model is obtained: obtaining a second current-sample source portrait picture displaying a second sample object; cropping the second current-sample source portrait picture to obtain a second sample face region picture corresponding to the face of the second sample object; inputting the second sample face region picture into the generation network model to generate a second current-sample target portrait picture of the second sample object; inputting a third sample pair including the second sample face region picture and the second current-sample source portrait picture and a fourth sample pair including the second sample face region picture and the second current-sample target portrait picture to the converged determining network model; obtaining a new sample source portrait picture displaying the second sample object to be used as the second current-sample source portrait picture if the output result of the converged determining network model indicates that the generation network model does not converge; and using the converged generation network model as the trained generation network model if the output result of the converged determining network model indicates that the generation network model converges.

In this embodiment, after a face region picture is obtained by cropping a source portrait picture, the face region picture is inputted to the adversarial neural network model that has been trained, and the adversarial neural network model generates a target portrait picture displaying a target hairstyle matching the face of a target object, so that a user no longer needs to manually generate a target portrait picture by performing hairstyle matching multiple times according to personal aesthetics, thereby improving efficiency of generating the target portrait picture, helping the user quickly determine an optimal solution, and improving user experience.

As an optional implementation, the inputting the face region picture to a picture generation model to obtain an output result of the picture generation mode includes the following steps:

S1. Extract, through an encoding module in the picture generation model, a facial feature matching the face of the target object from the face region picture.

S2. Obtain, through a decoding module in the picture generation model, the target hairstyle matching the facial feature of the target object.

Optionally, the encoding module may extract a facial feature matching the face of the target object by, but not limited to, identifying a color of each pixel in the face region picture.

Optionally, the decoding module may generate, but not limited to, a plurality of hairstyles, and select one of the plurality of hairstyles as the target hairstyle to substitute an original hairstyle of the target object, thereby generating the target portrait picture.

For example, a color of each pixel in a face region picture is identified to extract a facial feature of a target object, after a plurality of hairstyles are generated, a hairstyle having the highest matching degree with the facial feature is selected as a target hairstyle, and a target portrait picture is generated according to the facial feature and the target hairstyle.

According to this embodiment, the facial feature is extracted through the encoding module in the picture generation model, the target hairstyle is obtained through the decoding module in the picture generation model, and a target portrait picture is further generated according to the target hairstyle, to ensure that the generated target portrait picture is in line with an effect expected by a user.

In an optional implementation, the obtaining, through a decoding module in the picture generation model, the target hairstyle matching the facial feature of the target object includes the following steps:

S1. Determine a set of candidate hairstyles according to the facial feature of the target object.

S2. Obtain, from the set of candidate hairstyles, a hairstyle having the highest matching degree with the facial feature of the target object as the target hairstyle.

Figure 5:
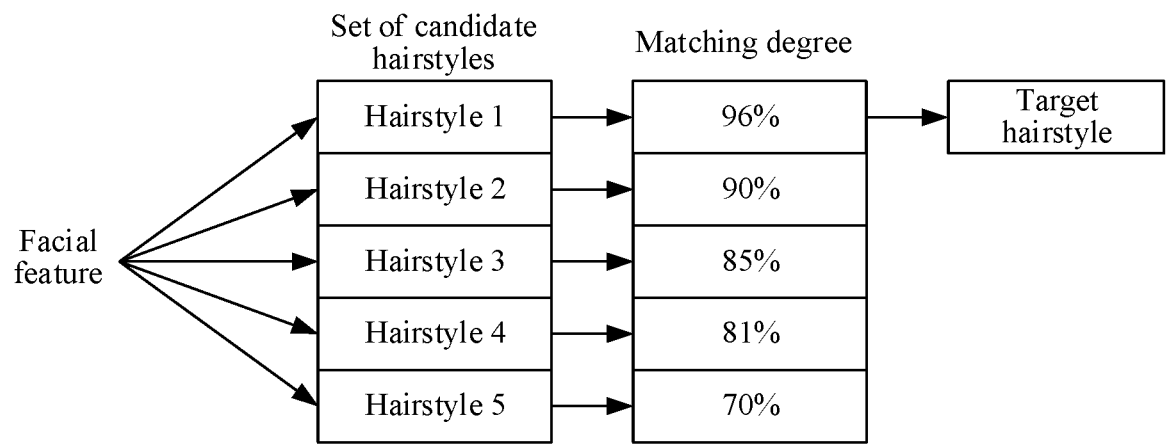
FIG. 5 is a schematic diagram of another optional picture generation method according to an embodiment of this disclosure.

For example, a set of candidate hairstyles includes 5 hairstyles. As shown in FIG. 5, there is a matching degree between each hairstyle and the facial feature. The hairstyles are sorted according to the matching degree, and the hairstyle having the highest matching degree is determined as the target hairstyle. Therefore, a hairstyle 1 may be determined as the target hairstyle. The hairstyle 1 is used to substitute the original hairstyle of the target object, to generate a target portrait picture.

In this embodiment, the hairstyle having the highest matching degree is obtained as the target hairstyle, thereby improving accuracy of target hairstyle selection, helping a user quickly determine an optimal solution, and improving user experience. In an optional implementation, the generating a target portrait picture by using the output result of the picture generation model includes the following step:

S1. Substitute an original hairstyle of the target object in the source portrait picture with the target hairstyle to generate the target portrait picture.

For example, after obtaining the target hairstyle, the original hairstyle of a target object may be cropped, and the target hairstyle is used to substitute the original hairstyle to obtain a target portrait picture. Alternatively, the original hairstyle may be covered by the target hairstyle directly to obtain the target portrait picture.

In this embodiment, the target hairstyle is used to substitute the original hairstyle of the target object in the source portrait picture, so that a suitable target hairstyle can be selected for the target object, thereby helping a user quickly determine an optimal solution, and improving user experience.

In an optional implementation, before obtaining a source portrait picture displaying a target object, the method further includes the following steps:

S1. Obtain a plurality of sample pictures.

S2. Train an adversarial neural network model by using the plurality of sample pictures, the adversarial neural network model including: a generation network model matching a picture generation model, and a determining network model configured to determine a generation result of the generation network model.

Optionally, the sample pictures may be obtained by, but not limited to, downloading public pictures directly, or through a crawling means. For example, the plurality of sample pictures may be downloaded from a set of pictures that have been published on the Internet; and the adversarial neural network model may be trained by using the plurality of sample pictures.

In this embodiment, the adversarial neural network model is trained by using obtained pictures that have been published, so that the adversarial neural network model may be trained by using a large amount of data, thereby improving accuracy of the adversarial neural network model.

In an optional implementation, the obtaining a plurality of sample pictures includes the following step:

S1. Obtain a set of valid sample pictures matching a keyword from a network, the keyword may be used for indicating a hot or trending topic (e.g., a hot topic in a social network). In one implementation, the network may be an intranet or an internet.

S2. Use valid sample pictures in the set of valid sample pictures as the plurality of sample pictures for training an adversarial neural network model.

Optionally, the keyword may be, but is not limited to, any descriptive words, such as handsome man, beautiful woman, long hair, short hair, traditional, classical, fashion, sexy, and trendy. For example, a keyword short hair is received, a set of valid sample pictures is obtained through searching by keyword, and the set of valid sample pictures includes valid sample pictures corresponding to short hair. The valid sample pictures in the obtained set of valid sample pictures are used for training the adversarial neural network model.

In this embodiment, valid sample pictures are selected according to the keyword, as pictures for training the adversarial neural network model, so that the adversarial neural network model may be selectively trained, thereby improving training efficiency of a neural network model.

In an optional implementation, using a plurality of sample pictures for training the adversarial neural network model includes:

performing following steps repeatedly until an output result of a generation network model in the adversarial neural network model converges to a predetermined threshold:

S1. Train the determining network model in the adversarial neural network model until a converged determining network model is obtained.

S2. Train the generation network model by using the converged determining network model until a converged generation network model is obtained.

S3. Train the determining network model continuously by using the converged generation network model if output result of the converged generation network model does not converge to the predetermined threshold.

S4. Use the converged generation network model as the picture generation model and terminate the training process if the output result of the converged generation network model converges to the predetermined threshold.

Optionally, the predetermined threshold may be, but is not limited to, a preset value. The predetermined threshold may be greater than or equal to zero and less than or equal to 1. For example, if the predetermined threshold is 0.5, then the output result converges to the predetermined threshold may be, but is not limited to, that the output result be greater than or equal to 0.5. After the generation network model obtains the output result, the converged determining network model is configured to determine the obtained output result. If it is determined that the output result is less than 0.5, the training process of the converged determining network model and the converged generation network model continues. If it is determined that the output result is greater than 0.5, the converged generation network model is determined as the picture generation model, the training process terminates, and the face region picture is processed by using the picture generation model to obtain the target portrait picture.

In this embodiment, the determining network model and the generation network model are trained through the foregoing steps, so that a converged determining network model and a converged generation network model are obtained, and the converged generation network model is used as a picture generation model, thereby helping a user quickly determine an optimal solution and improving user experience.

In an optional implementation, training the determining network model in the adversarial neural network model includes:

performing following steps repeatedly until the converged determining network model is obtained:

S1. Obtain a first current-sample source portrait picture displaying a first sample object.

S2: Crop the first current-sample source portrait picture to obtain a first sample face region picture corresponding to the face of the first sample object.

S3: Input the first sample face region picture to the generation network model to generate a first current-sample target portrait picture of the first sample object.

S4. Input a first sample pair including the first sample face region picture and the first current-sample source portrait picture and a second sample pair including the first sample face region picture and the first current-sample target portrait picture to the determining network model for training.

S5. Obtain a new sample source portrait picture displaying the first sample object to be used as the first current-sample source portrait picture if the output result of the determining network model does not converge.

S6. Obtain the converged determining network model if the output result of the determining network model converges, and terminates the training process.

Figure 6:
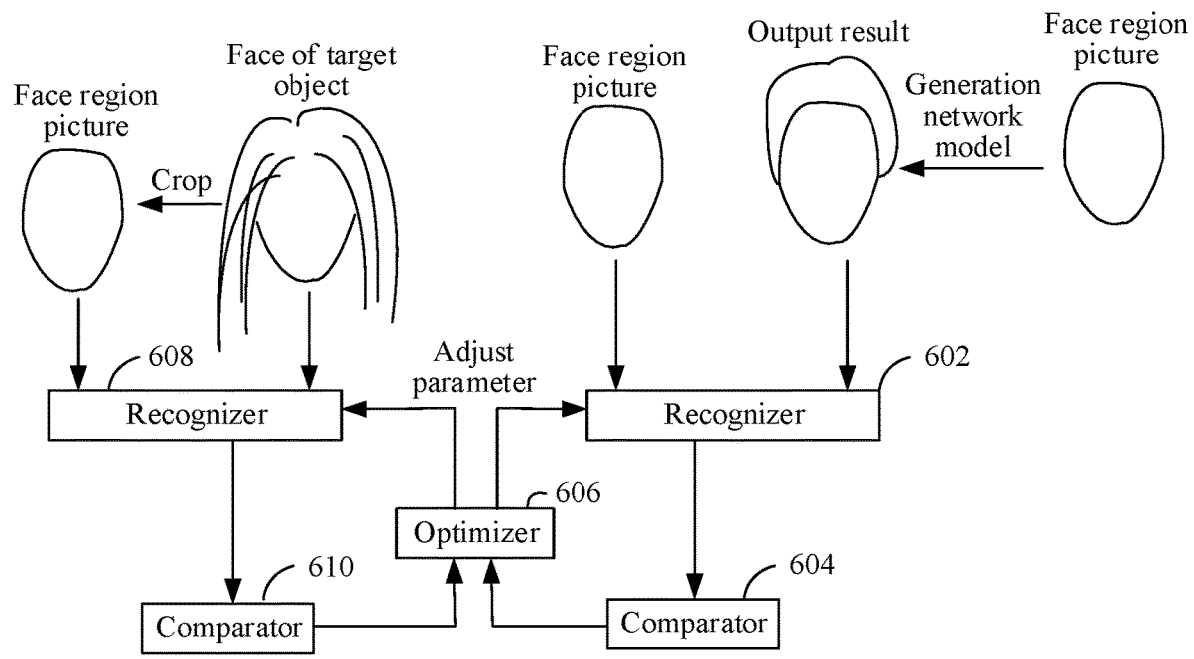
FIG. 6 is a schematic diagram of another optional picture generation method according to an embodiment of this disclosure.

For example, as shown in FIG. 6, FIG. 6 is a schematic diagram of a process of training a determining network model. After the first current-sample source portrait picture is obtained, cropping is performed for the face of the target object in the source portrait picture, to obtain a face region picture with the head hair removed, and the face region picture is inputted to the generation network model to obtain an output result. The face region picture and the output result are inputted to a recognizer 602 as a negative sample. The recognizer 602 perform recognition on the negative sample, obtains a recognition result of the negative sample, and inputs the recognition result of the negative sample to a comparator 604. The comparator 604 performs comparison on the recognition result of the negative sample to obtain a comparison result of the negative sample, and transmits the comparison result of the negative sample to an optimizer 606. The optimizer 606 determines whether to adjust a parameter of the recognizer 602 according to the comparison result of the negative sample.

In addition, after a target object is cropped to obtain a face region picture, the target object and the face region picture are inputted into a recognizer 608 as a positive sample. The recognizer 608 perform recognition on the positive sample, obtains a recognition result of the positive sample, and inputs the recognition result of the positive sample into a comparator 610. The comparator 610 performs comparison on the recognition result of the positive sample to obtain a comparison result of the positive sample, and transmits the comparison result of the positive sample to the optimizer 606. The optimizer 606 determines whether to adjust a parameter of the recognizer 608 according to the comparison result of the positive sample.

After the training by using the positive sample and negative sample, parameters of the recognizer 602 and the recognizer 608 become more mature and robust, so that a converged determining network model may be formed. The converged determining network model herein refers to a determining network model that is obtained through training and that tends to converge. It is to be understood that when a model error is less than a preset error threshold during a training process, the model may be determined as tending to converge. After the converged determining network model is obtained, the converged determining network model may be configured to determine an output result of a generation network model.

In this embodiment, the determining network model is trained through the foregoing method until the converged determining network model is obtained, thereby improving accuracy of the obtained determining network model.

In an optional implementation, training the generation network model by using the converged determining network model includes:

performing following steps repeatedly until the converged generation network model is obtained:

S1. Obtain a second current-sample source portrait picture displaying a second sample object.

S2. Crop the second current-sample source portrait picture to obtain a second sample face region picture corresponding to the face of the second sample object.

S3. Input the second sample face region picture to the generation network model to generate a second current-sample target portrait picture of the second sample object.

S4. Input a third sample pair including the second sample face region picture and the second current-sample source portrait picture and a fourth sample pair including the second sample face region picture and the second current-sample target portrait picture to the converged determining network model.

S5. Obtain a new sample source portrait picture displaying the second sample object to be used as the second current-sample source portrait picture if the output result of the converged determining network model indicates that the generation network model does not converge.

S6. Obtain the converged generation network model if the output result of the converged determining network model indicates that the generation network model converges, and terminates the training process.

Figure 7:
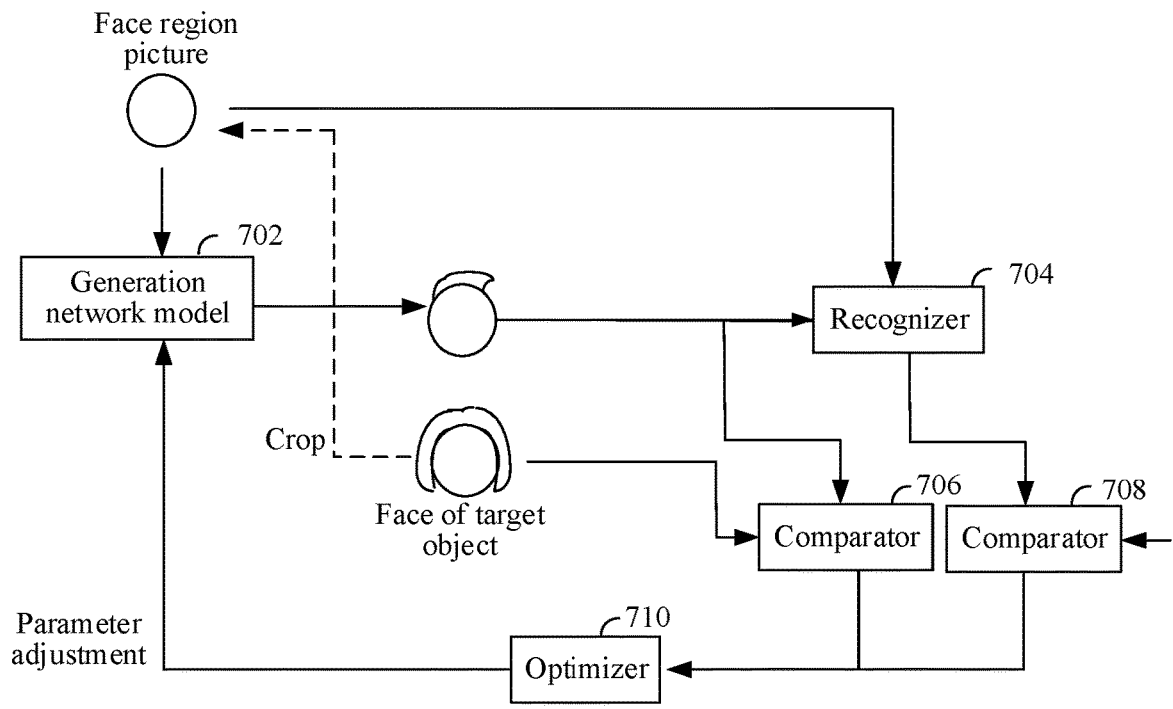
FIG. 7 is a schematic diagram of another optional picture generation method according to an embodiment of this disclosure.

For example, as shown in FIG. 7, after a source portrait picture is obtained, cropping is performed for the face of a target object in the source portrait picture, to obtain a face region picture. The face region picture is inputted to a generation network model 702, so that an output result of the generation network model 702 is obtained. The output result and the face region picture are inputted to a recognizer 704, and the recognizer 704 performs recognition. After the recognizer 704 obtains a recognition result, the recognition result is transmitted to a comparator 708 to obtain a comparison result. In addition, the face of the target object and the output result of the generation network model are inputted to the comparator 706, and the comparator 706 outputs another comparison result. The two comparison results are inputted to an optimizer 710, and the optimizer 710 determines whether to adjust a parameter of the generation network model according to the two comparison results. Since the recognizer 704, the comparator 706, and the comparator 708 have been trained, if the output result of the generation network model 702 does not meet requirements, the optimizer 710 needs to adjust the parameter of the generation network model 702 according to the two comparison results.

After the generation network model is adjusted, the adjusted generation network model is used for obtaining the output result according to the face region picture, and a new output result is inputted into the recognizer 704, the comparator 706, and the comparator 708 for determining. If the output result of the generation network model 702 meets the requirements, there is no need to adjust the parameter of the generation network model 702. In this case, a mature and robust generation network model 702 is obtained.

In this embodiment, the generation network model is trained through the foregoing method until the converged generation network model is obtained, thereby improving accuracy of the obtained generation network model.

To make the description simple, the foregoing method embodiments are stated as a series of action combinations. However, a person skilled in the art needs to learn that this disclosure is not limited to the described sequence of the actions because according to this disclosure, some steps may use another sequence or may be simultaneously performed. In addition, it is to be understood by a person skilled in the art that the embodiments described in the disclosure are all exemplary embodiments and the related actions and modules are not mandatory to this disclosure.

According to the foregoing descriptions of implementations, a person skilled in the art may clearly learn that the method according to the foregoing embodiments may be implemented by using software and a necessary general hardware platform, or certainly may be implemented by using hardware. However, in most cases, the former is a better implementation. Based on such an understanding, the technical solutions of this disclosure essentially, or the part contributing to the related art may be implemented in a form of a software product. The computer software product may be stored in a storage medium (for example, a ROM/RAM, a magnetic disk, or a compact disc), and includes several instructions for instructing a terminal device (which may be a mobile phone, a computer, a server, a network device, or the like) to perform the methods according to the embodiments of this disclosure.

Figure 4:
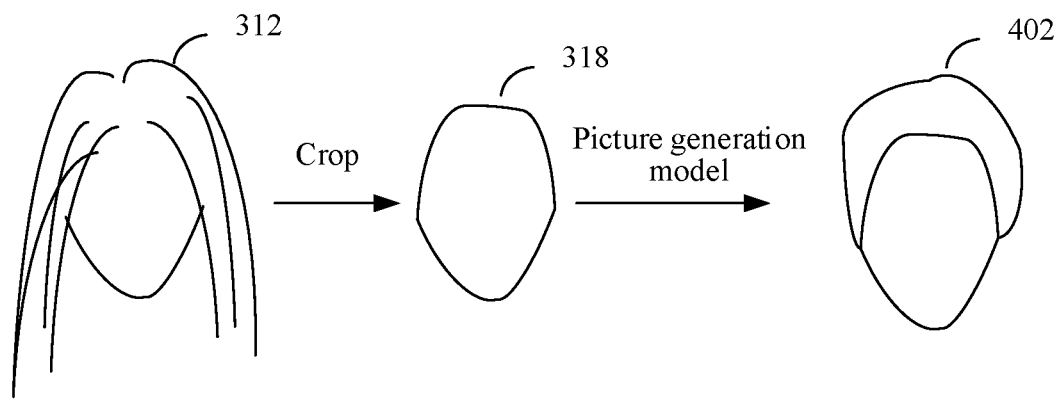
FIG. 4 is a schematic diagram of another optional picture generation method according to an embodiment of this disclosure.

The foregoing picture generation method will be described below with reference to specific examples. Using an example in which a source portrait picture includes a target object, after the source portrait picture is obtained, the source portrait picture is cropped to obtain a face region picture. For example, as shown in FIG. 4, hair of the target object in the source portrait picture is cropped to obtain a face region picture that retains only a facial feature. After the face region picture is obtained, the face region picture is inputted to a mature adversarial neural network model. The adversarial neural network model includes a picture generation model and a converged determining network model. The face region picture is inputted to the picture generation model to obtain an output result. For example, a picture 402 in FIG. 4 is the output result. In the output result, hair is added to the inputted face region picture that retains only a facial feature.

Through the process, a target hairstyle may be automatically generated for the target object in the source portrait picture through the adversarial neural network model. To obtain the mature adversarial neural network model, the adversarial neural network model needs to be trained in advance. Specifically, the determining network model in the adversarial neural network model is first trained. A source portrait picture including a hairstyle (e.g., face of target object that is provided to the recognizer 608, FIG. 6) and a cropped face region picture (e.g., face region picture that is provided to the recognizer 608, FIG. 6) are taken as a positive sample, and the face region picture (e.g., face region picture that is provided to the recognizer 602, FIG. 6) and an output result (e.g., output result that is provided to the recognizer 602, FIG. 6) generated by an untrained generation network model are taken as a negative sample. The positive and negative samples are inputted to the determining network model, to train the determining network model. After a recognition accuracy rate of the determining network model exceeds an empirical value, the output result of the generation network model is recognized through the determining network model until the determining network model cannot accurately determine that a result of inputting is the source portrait picture. The process is repeatedly performed until a mature adversarial neural network model is obtained.

Figure 8:
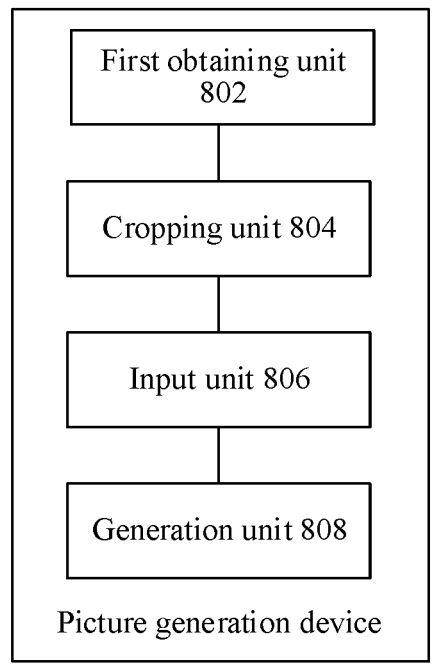
FIG. 8 is a schematic structural diagram of an optional picture generation device according to an embodiment of this disclosure.

According to another aspect of the embodiments of this disclosure, a picture generation device for performing the foregoing picture generation method is further provided. As shown in FIG. 8, the device includes:

(1) a first obtaining unit 802, configured to obtain a source portrait picture displaying a target object;

(2) a cropping unit 804, configured to crop the source portrait picture to obtain a face region picture corresponding to the face of the target object;

(3) an input unit 806, configured to input the face region picture to a picture generation model to obtain an output result of the picture generation model, the picture generation model being obtained after machine learning training through an adversarial neural network model by using a plurality of sample pictures; and (4) a generation unit 808, configured to generate a target portrait picture by using the output result of the picture generation model, the target portrait picture displaying a target hairstyle matching the face of the target object.

Figure 9:
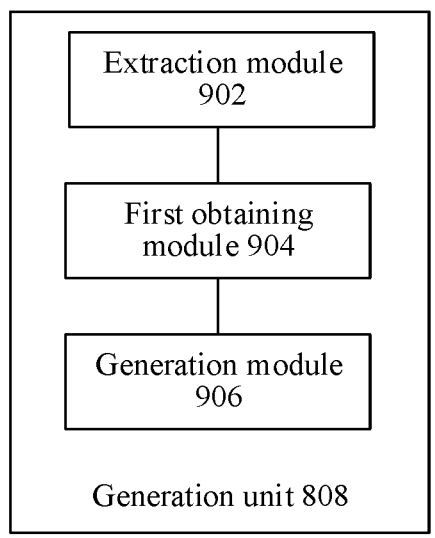
FIG. 9 is a schematic diagram of another optional picture generation device according to an embodiment of this disclosure.

In an optional implementation, as shown in FIG. 9, the input unit 806 includes:

(1) an extraction module 902, configured to extract, through an encoding module in the picture generation model, a facial feature matching the face of the target object from the face region picture; and (2) a first obtaining module 904, configured to obtain, through a decoding module in the picture generation model, the target hairstyle matching the facial feature of the target object.

In an optional implementation, the first obtaining module 904 includes:

(1) a determining submodule, configured to determine a set of candidate hairstyles according to the facial feature of the target object; and (2) a first obtaining submodule, configured to obtain, from the set of candidate hairstyles, a hairstyle having the highest matching degree with the facial feature of the target object as the target hairstyle.

In an optional implementation, the generation unit 808 includes:

(1) a substitution submodule, configured to substitute an original hairstyle of the target object in the source portrait picture with the target hairstyle to generate the target portrait picture.

In an optional implementation, the device further includes:

(1) a second obtaining unit, configured to obtain the plurality of sample pictures before obtaining the source portrait picture displaying the target object; and (2) a training unit, configured to train the adversarial neural network mode by using the plurality of sample pictures, the adversarial neural network model including: a generation network model matching the picture generation model, and a determining network model configured to determine a generation result of the generation network model.

In an optional implementation, the second obtaining unit includes:

(1) a second obtaining module, configured to obtain a set of valid sample pictures matching a keyword from a network, the keyword may be indicating a hot or trending topic (e.g., a hot topic in a social network); and (2) a first determining module, configured to use valid sample pictures in the set of valid sample pictures as the plurality of sample pictures for training an adversarial neural network model.

In an optional implementation, the training unit includes the following modules and is configured to:

repeatedly perform steps through the following modules until an output result of a generation network model in the adversarial neural network model converges to a predetermined threshold:

(1) a first training module, configured to train the determining network model in the adversarial neural network model until a converged determining network model is obtained;

(2) a second training module, configured to train the generation network model by using the converged determining network model until a converged generation network model is obtained;

(3) a third training module, configured to train the determining network model continuously by using the converged generation network model if the output result of the converged generation network model does not converge to the predetermined threshold; and (4) a second determining module, configured to use the converged generation network model as the picture generation model if the output result of the converged generation network model converges to the predetermined threshold and terminate the training process.

In an optional implementation, the first training module includes the following submodules and is configured to:

repeatedly perform steps performed by the following submodules until the converged determining network model is obtained:

(1) a second obtaining submodule, configured to obtain a first current-sample source portrait picture displaying a first sample object;

(2) a first cropping submodule, configured to crop the first current-sample source portrait picture to obtain a first sample face region picture corresponding to the face of the first sample object;

(3) a first input submodule, configured to input the first sample face region picture into the generation network model to generate a first current-sample target portrait picture of the first sample object;

(4) a second input submodule, configured to input a first sample pair including the first sample face region picture and the first current-sample source portrait picture and a second sample pair including the first sample face region picture and the first current-sample target portrait picture to the determining network model for training;

(5) a third obtaining submodule, configured to obtain a new sample source portrait picture displaying the first sample object to be used as the first current-sample source portrait picture if the output result of the determining network model does not converge; and (6) a fourth obtaining submodule, configured to obtain the converged determining network model if the output result of the determining network model converges.

In an optional implementation, the second training module includes the following submodules and is configured to:

repeatedly perform steps performed by the following submodules until the converged generation network model is obtained:

(1) a fifth obtaining submodule, configured to obtain a second current-sample source portrait picture displaying a second sample object;

(2) a second cropping submodule, configured to crop the second current-sample source portrait picture to obtain a second sample face region picture corresponding to the face of the second sample object;

(3) a third input submodule, configured to input the second sample face region picture into the generation network model to generate a second current-sample target portrait picture of the second sample object;

(4) a fourth input submodule, configured to input a third sample pair including the second sample face region picture and the second current-sample source portrait picture and a fourth sample pair including the second sample face region picture and the second current-sample target portrait picture to the converged determining network model;

(5) a sixth obtaining submodule, configured to obtain a new sample source portrait picture displaying the second sample object to be used as the second current-sample source portrait picture if the output result of the converged determining network model indicates that the generation network model does not converge; and (6) a seventh obtaining submodule, configured to obtain the converged generation network model if the output result of the converged determining network model indicates that the generation network model converges. In this embodiment, after a face region picture is obtained by cropping a source portrait picture, the face region picture is inputted to the adversarial neural network model that has been trained, and the adversarial neural network model generates a target portrait picture displaying a target hairstyle matching the face of a target object, so that a user no longer needs to manually generate a target portrait picture by performing hairstyle matching multiple times according to personal aesthetics, thereby improving efficiency of generating the target portrait picture, helping the user quickly determine an optimal solution, and improving user experience.

Figure 10:
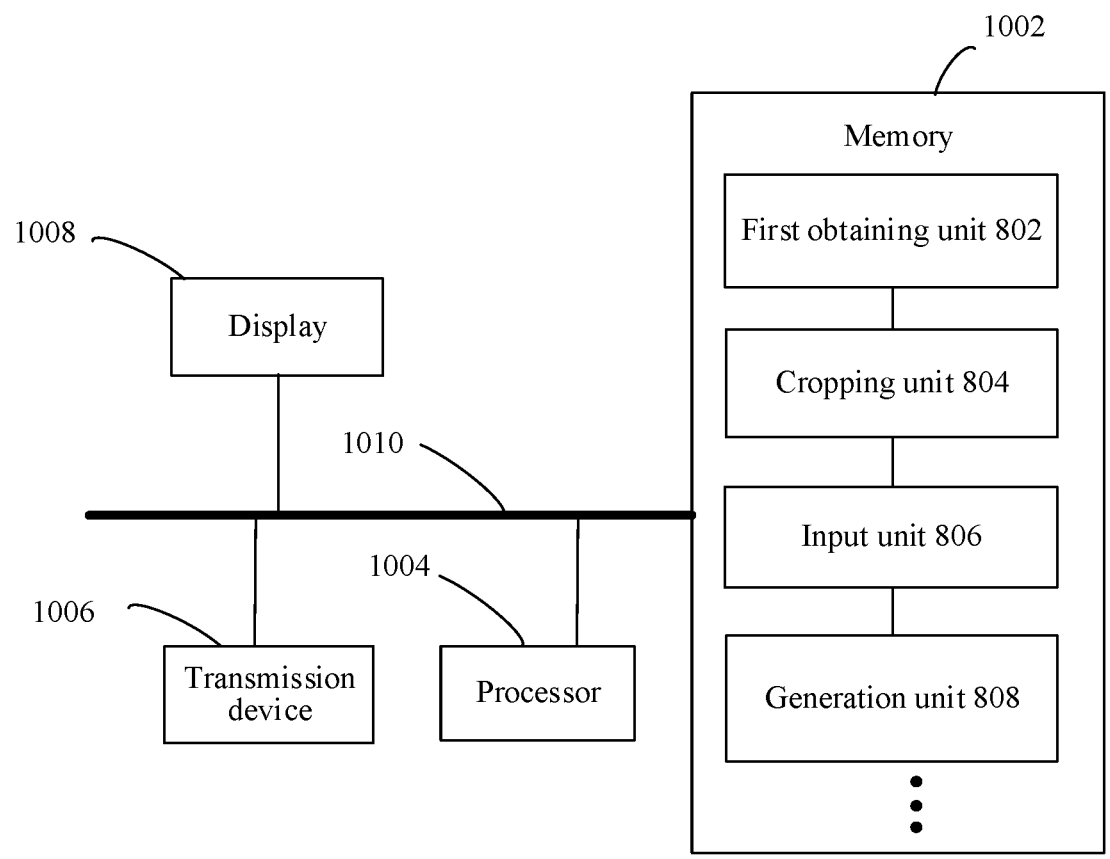
FIG. 10 is a schematic structural diagram of an optional electronic device according to an embodiment of this disclosure.

According to still another aspect of the embodiments of this disclosure, an electronic device for performing the foregoing picture generation method is further provided. As shown in FIG. 10, the electronic device includes a memory and a processor, the memory storing a computer program, and the processor being configured to perform steps according to any one of the foregoing method embodiments by using the computer program.

Optionally, in this embodiment, the electronic device may be located in at least one of a plurality of network devices in a computer network.

Optionally, in this embodiment, the processor may be configured to perform the following steps by using the computer program:

S1. Obtain a source portrait picture displaying a target object.

S2. Crop the source portrait picture to obtain a face region picture corresponding to the face of the target object.

S3. Input the face region picture to a picture generation model to obtain an output result of the picture generation model, the picture generation model being obtained after machine learning training through an adversarial neural network model by using a plurality of sample pictures.

S4. Generate a target portrait picture by using the output result of the picture generation model, the target portrait picture displaying a target hairstyle matching the face of the target object.

Optionally, a person of ordinary skill in the art may understand that, the structure shown in FIG. 10 is only illustrative. The electronic device may be a terminal device such as a smartphone (for example, an Android mobile phone or an iOS mobile phone), a tablet computer, a palmtop computer, a mobile Internet device (MID), or a PAD. FIG. 10 does not constitute a limitation on a structure of the foregoing electronic device. For example, the electronic device may alternatively include more or fewer components (such as a network interface and a display device) than those shown in FIG. 10, or has a configuration different from that shown in FIG. 10.

The memory 1002 may be configured to store a software program and a module, for example, a program instruction/module corresponding to the picture generation method and device in the embodiments of this disclosure, and the processor 1004 performs various functional applications and data processing by running a software program and a module stored in the memory 1002, that is, implementing the foregoing picture generation method. The memory 1002 may include a high-speed random memory, and may also include a non-volatile memory, for example, one or more magnetic storage apparatuses, a flash memory, or another nonvolatile solid-state memory. In some examples, the memory 1002 may further include memories remotely disposed relative to the processor 1004, and the remote memories may be connected to a terminal through a network. Instances of the network include, but are not limited to, the Internet, an intranet, a local area network, a mobile communications network, and a combination thereof. The memory 1002 may specifically store, but is not limited to, information such as a source portrait picture and a target portrait picture. In an example, as shown in FIG. 10, the memory 1002 may include, but is not limited to, a first obtaining unit 802, a cropping unit 804, an input unit 806, and a generation unit 808 in the foregoing picture generation device. In addition, the memory may further include, but is not limited to, other modules or units in the foregoing picture generation device, and details are not described in this example again.

Optionally, the transmission device 1006 is configured to receive or transmit data through a network. Specific examples of the foregoing network can include a wired network and a wireless network. In an example, the transmission device 1006 includes a network interface controller (NIC). The NIC may be connected to another network device and a router by using a network cable, so as to communicate with the Internet or a local area network. In an example, the transmission device 1006 is a radio frequency (RF) module, which communicates with the Internet in a wireless manner.

In addition, the foregoing electronic device further includes: a display 1008, configured to display a target portrait picture; and a connection bus 1010, configured to connect various module components in the foregoing electronic device.

According to still another aspect of the embodiments of this disclosure, a non-transitory computer-readable storage medium is further provided. The non-transitory storage medium stores a computer program, the computer program, when executed, being configured to perform steps in any one of the foregoing method embodiments.

Optionally, in this embodiment, the storage medium may be configured to store a computer program for performing the following steps:

S1. Obtain a source portrait picture displaying a target object.

S2. Crop the source portrait picture to obtain a face region picture corresponding to the face of the target object.

S3. Input the face region picture to a picture generation model to obtain an output result of the picture generation model, the picture generation model being obtained after machine learning training through an adversarial neural network model by using a plurality of sample pictures.

S4. Generate a target portrait picture by using the output result of the picture generation model, the target portrait picture displaying a target hairstyle matching the face of the target object.

Optionally, in this embodiment, the non-transitory storage medium may be configured to store a computer program for performing the following steps:

S1. Extract, through an encoding module in the picture generation model, a facial feature matching the face of the target object from the face region picture.

S2. Obtain, through a decoding module in the picture generation model, the target hairstyle matching the facial feature of the target object.

Optionally, in this embodiment, the non-transitory storage medium may be configured to store a computer program for performing the following steps:

S1. Determine a set of candidate hairstyles according to the facial feature of the target object.

S2. Obtain, from the set of candidate hairstyles, a hairstyle having the highest matching degree with the facial feature of the target object as the target hairstyle.

Optionally, in this embodiment, the non-transitory storage medium may be configured to store a computer program for performing the following steps:

S1. Substitute an original hairstyle of the target object in the source portrait picture with the target hairstyle to generate the target portrait picture.

Optionally, in this embodiment, the non-transitory storage medium may be configured to store a computer program for performing the following steps:

S1. Obtain a plurality of sample pictures.

S2. Train an adversarial neural network mode by using the plurality of sample pictures, the adversarial neural network model including: a generation network model matching a picture generation model, and a determining network model configured to determine a generation result of the generation network model.

Optionally, in this embodiment, the non-transitory storage medium may be configured to store a computer program for performing the following steps:

S1. Obtain a set of valid sample pictures matching a keyword from a network, the keyword may be used for indicating a hot or trending topic (e.g., a hot topic in a social network).

S2. Use valid sample pictures in the set of valid sample pictures as the plurality of sample pictures for training an adversarial neural network model.

Optionally, in this embodiment, the non-transitory storage medium may be configured to store a computer program for performing the following steps:

S1. Train the determining network model in the adversarial neural network model until a converged determining network model is obtained.

S2. Train the generation network model by using the converged determining network model until a converged generation network model is obtained.

S3. Train the determining network model continuously by using the converged generation network model if the output result of the converged generation network model does not converge to the predetermined threshold.

S4. Use the converged generation network model as the picture generation model if the output result of the converged generation network model converges to the predetermined threshold.

Optionally, in this embodiment, the non-transitory storage medium may be configured to store a computer program for performing the following steps:

S1. Obtain a first current-sample source portrait picture displaying a first sample object.

S2: Crop the first current-sample source portrait picture to obtain a first sample face region picture corresponding to the face of the first sample object.

S3: Input the first sample face region picture to the generation network model to generate a first current-sample target portrait picture of the first sample object.

S4. Input a first sample pair including the first sample face region picture and the first current-sample source portrait picture and a second sample pair including the first sample face region picture and the first current-sample target portrait picture to the determining network model for training.

S5. Obtain a new sample source portrait picture displaying the first sample object to be used as the first current-sample source portrait picture if the output result of the determining network model does not converge.

S6. Obtain the converged determining network model if the output result of the determining network model converges.

Optionally, in this embodiment, the storage medium may be configured to store a computer program for performing the following steps:

S1. Obtain a second current-sample source portrait picture displaying a second sample object.

S2. Crop the second current-sample source portrait picture to obtain a second sample face region picture corresponding to the face of the second sample object.

S3: Input the first sample face region picture to the generation network model to generate a first current-sample target portrait picture of the first sample object.

S4. Input a third sample pair including the second sample face region picture and the second current-sample source portrait picture and a fourth sample pair including the second sample face region picture and the second current-sample target portrait picture to the converged determining network model.

S5. Obtain a new sample source portrait picture displaying the second sample object to be used as the second current-sample source portrait picture if the output result of the converged determining network model indicates that the generation network model does not converge.

S6. Obtain the converged generation network model if the output result of the converged determining network model indicates that the generation network model converges.

Optionally, in this embodiment, a person of ordinary skill in the art may understand that all or some of the steps of the methods in the foregoing embodiments may be implemented by a program by instructing hardware relevant to a terminal device. The program may be stored in a computer-readable storage medium, and the storage medium may include: a flash drive, a read-only memory (ROM), a random access memory (RAM), a magnetic disk, a compact disc, and the like.

According to still another aspect of the embodiments of this disclosure, a computer program product is further provided, the computer program product, when run on a computer, causing the computer to perform steps in any one of the foregoing method embodiments.

The sequence numbers of the foregoing embodiments of this disclosure are merely for description purpose but do not indicate the preference of the embodiments.

In a case that the integrated unit in the foregoing embodiments is implemented in the form of a software function unit and sold or used as an independent product, the integrated unit can be stored in the foregoing computer-readable storage medium. Based on such an understanding, the technical solutions of this disclosure essentially, or the part contributing to the existing technology, or all or some of the technical solutions may be implemented in a form of a software product. The computer software product is stored in a storage medium and includes several instructions for instructing one or more computer devices (which may be a personal computer, a server, a network device, or the like) to perform all or some of the steps of the methods described in the embodiments of this disclosure.

In the foregoing embodiments of this disclosure, the descriptions of the embodiments have their respective focuses. For a part that is not described in detail in an embodiment, reference may be made to related descriptions in other embodiments.

In the several embodiments provided in this disclosure, it is to be understood that the disclosed client can be implemented in other manners. The described device embodiment is merely an example. For example, the unit division is merely logical function division and may be another division in an actual implementation. For example, a plurality of units or components may be combined or integrated into another system, or some features may be ignored or not executed. In addition, the coupling, or direct coupling, or communication connection between the displayed or discussed components may be the indirect coupling or communication connection by means of some interfaces, units, or modules, and may be in electrical or other forms.

The units described as separate parts may or may not be physically separate, and the parts displayed as units may or may not be physical units, may be located in one place, or may be distributed on multiple network units. Some or all of the units may be selected according to actual needs to achieve the objectives of the solutions of the embodiments.

In addition, functional units in the embodiments of this disclosure may be integrated into one processing unit, or each of the units may exist alone physically, or two or more units are integrated into one unit. The integrated unit may be implemented in the form of hardware, or may be implemented in the form of a software function unit.

The foregoing descriptions are merely exemplary implementations of this disclosure. A person of ordinary skill in the art may make improvements and modifications without departing from the principle of this disclosure, and all such improvements and modifications fall within the protection scope of this disclosure.

What is claimed is:

1. A method for picture generation, applied to user equipment, the method comprising:
   obtaining a plurality of sample pictures;
   performing following training steps for training an adversarial neural network model by using the plurality of sample pictures, the adversarial neural network model comprising: a generation network model matching the picture generation model, and a determining network model, configured to determine a generation result of the generation network model:
      training the determining network model using the generation network model until a converged determining network model is obtained; and
      training the generation network model by using the converged determining network model until a converged generation network model is obtained;
   in response to an output result of the converged generation network model not converging to a predetermined threshold, updating the generation network model with the converged generation network model and repeating the training steps;
   in response to the output result of the converged generation network model converging to the predetermined threshold, using the converged generation network model as a picture generation model;
   obtaining a source portrait picture displaying a target object;
   cropping the source portrait picture to obtain a face region picture corresponding to a face of the target object excluding a hair portion;

inputting the face region picture to the picture generation model to obtain an output result of the picture generation model; and generating a target portrait picture by using the output result of the picture generation model, the target portrait picture displaying a target hairstyle matching the face of the target object.

2. The method according to claim 1, wherein inputting the face region picture to the picture generation model to obtain the output result of the picture generation model comprises:

extracting, through an encoding module in the picture generation model, a facial feature corresponding to the face of the target object from the face region picture; and obtaining, through a decoding module in the picture generation model, the target hairstyle matching the facial feature of the target object.

3. The method according to claim 2, wherein obtaining, through the decoding module in the picture generation model, the target hairstyle matching the facial feature of the target object comprises:

determining a set of candidate hairstyles according to the facial feature of the target object; and obtaining, from the set of candidate hairstyles, a hairstyle having a highest matching degree with the facial feature of the target object as the target hairstyle.

4. The method according to claim 2, wherein generating the target portrait picture by using the output result of the picture generation model comprises:

substituting an original hairstyle of the target object with the target hairstyle in the source portrait picture to generate the target portrait picture.

5. The method according to claim 1, wherein obtaining the plurality of sample pictures comprises:

obtaining a set of valid sample pictures matching a keyword from a network, the keyword being used for indicating a hot topic; and using valid sample pictures in the set of valid sample pictures as the plurality of sample pictures for training the adversarial neural network model.

6. The method according to claim 1, wherein training the determining network model in the adversarial neural network model comprises:

obtaining a first sample source portrait picture displaying a first sample object; and performing following iteration:

cropping the first sample source portrait picture to obtain a first sample face region picture corresponding to the face of the first sample object;

inputting the first sample face region picture to the generation network model to generate a first sample target portrait picture of the first sample object;

inputting a first sample pair comprising the first sample face region picture and the first sample source portrait picture and a second sample pair comprising the first sample face region picture and the first sample target portrait picture to the determining network model for training;

in response to the output result of the determining network model not converging, obtaining a new sample source portrait picture displaying the first sample object to be used as the first sample source portrait picture and starting over the iteration; and in response to the output result of the determining network model converging, obtaining the converged determining network model and terminating the iteration.

7. The method according to claim 6, wherein training the generation network model by using the converged determining network model comprises:

obtaining a second sample source portrait picture displaying a second sample object; and performing following iteration:

cropping the second sample source portrait picture to obtain a second sample face region picture corresponding to the face of the second sample object;

inputting the second sample face region picture to the generation network model to generate a second sample target portrait picture of the second sample object;

inputting a third sample pair comprising the second sample face region picture and the second sample source portrait picture and a fourth sample pair comprising the second sample face region picture and the second sample target portrait picture to the converged determining network model;

in response to the output result of the converged determining network model indicating that the generation network model does not converge, obtaining a new sample source portrait picture displaying the second sample object to be used as the second sample source portrait picture and starting over the iteration; and in response to the output result of the converged determining network model indicating that the generation network model converges, obtaining the converged generation network model and terminating the iteration.

8. An apparatus for picture generation, comprising a memory for storing computer instructions and a processor in communication with the memory, wherein, when the processor executes the computer instructions, the processor is configured to cause the apparatus to:

obtain a plurality of sample pictures;

perform following training steps for training an adversarial neural network model by using the plurality of sample pictures, the adversarial neural network model comprising: a generation network model matching the picture generation model, and a determining network model, configured to determine a generation result of the generation network model:

train the determining network model using the generation network model until a converged determining network model is obtained; and train the generation network model by using the converged determining network model until a converged generation network model is obtained;

in response to an output result of the converged generation network model not converging to a predetermined threshold, update the generation network model with the converged generation network model and repeating the training steps;

in response to the output result of the converged generation network model converging to the predetermined threshold, use the converged generation network model as a picture generation model;

obtain a source portrait picture displaying a target object;

crop the source portrait picture to obtain a face region picture corresponding to a face of the target object excluding a hair portion;

input the face region picture to the picture generation model to obtain an output result of the picture generation model; and generate a target portrait picture by using the output result of the picture generation model, the target portrait picture displaying a target hairstyle matching the face of the target object.

9. The apparatus according to claim 8, wherein, when the processor is configured to cause the apparatus to input the face region picture to the picture generation model to obtain the output result of the picture generation model, the processor is configured to cause the apparatus to:
    extract, through an encoding module in the picture generation model, a facial feature corresponding to the face of the target object from the face region picture; and
    obtain, through a decoding module in the picture generation model, the target hairstyle matching the facial feature of the target object.

10. The apparatus according to claim 9, wherein, when the processor is configured to cause the apparatus to obtain, through the decoding module in the picture generation model, the target hairstyle matching the facial feature of the target object, the processor is configured to cause the apparatus to:
    determine a set of candidate hairstyles according to the facial feature of the target object; and
    obtain, from the set of candidate hairstyles, a hairstyle having a highest matching degree with the facial feature of the target object as the target hairstyle.

11. The apparatus according to claim 9, wherein, when the processor is configured to cause the apparatus to generate the target portrait picture by using the output result of the picture generation model, the processor is configured to cause the apparatus to:
    substitute an original hairstyle of the target object with the target hairstyle in the source portrait picture to generate the target portrait picture.

12. The apparatus according to claim 8, wherein, when the processor is configured to cause the apparatus to obtain the plurality of sample pictures, the processor is configured to cause the apparatus to:
    obtain a set of valid sample pictures matching a keyword from a network, the keyword being used for indicating a hot topic; and
    use valid sample pictures in the set of valid sample pictures as the plurality of sample pictures for training the adversarial neural network model.

13. The apparatus according to claim 8, wherein, when the processor is configured to cause the apparatus to train the determining network model in the adversarial neural network model, the processor is configured to cause the apparatus to:
    obtain a first sample source portrait picture displaying a first sample object; and
    perform following iteration:
        crop the first sample source portrait picture to obtain a first sample face region picture corresponding to the face of the first sample object;
        input the first sample face region picture to the generation network model to generate a first sample target portrait picture of the first sample object;
        input a first sample pair comprising the first sample face region picture and the first sample source portrait picture and a second sample pair comprising the first sample face region picture and the first sample target portrait picture to the determining network model for training;
        in response to the output result of the determining network model not converging, obtain a new sample source portrait picture displaying the first sample object to be used as the first sample source portrait picture and start over the iteration; and
        in response to the output result of the determining network model converging, obtain the converged determining network model and terminate the iteration.

14. The apparatus according to claim 13, wherein, when the processor is configured to cause the apparatus to train the generation network model by using the converged determining network model, the processor is configured to cause the apparatus to:
    obtain a second sample source portrait picture displaying a second sample object; and
    perform following iteration:
        crop the second sample source portrait picture to obtain a second sample face region picture corresponding to the face of the second sample object;
        input the second sample face region picture to the generation network model to generate a second sample target portrait picture of the second sample object;
        input a third sample pair comprising the second sample face region picture and the second sample source portrait picture and a fourth sample pair comprising the second sample face region picture and the second sample target portrait picture to the converged determining network model;
        in response to the output result of the converged determining network model indicating that the generation network model does not converge, obtain a new sample source portrait picture displaying the second sample object to be used as the second sample source portrait picture and start over the iteration; and
        in response to the output result of the converged determining network model indicating that the generation network model converges, obtain the converged generation network model and terminate the iteration.

15. A non-transitory storage medium for storing computer readable instructions, the computer readable instructions, when executed by a processor, causing the processor to:
    obtain a plurality of sample pictures;
    perform following training steps for training an adversarial neural network model by using the plurality of sample pictures, the adversarial neural network model comprising: a generation network model matching the picture generation model, and a determining network model, configured to determine a generation result of the generation network model:
        train the determining network model using the generation network model until a converged determining network model is obtained; and
        train the generation network model by using the converged determining network model until a converged generation network model is obtained;
    in response to an output result of the converged generation network model not converging to a predetermined threshold, update the generation network model with the converged generation network model and repeating the training steps;

in response to the output result of the converged generation network model converging to the predetermined threshold, use the converged generation network model as a picture generation model:

obtain a source portrait picture displaying a target object;

crop the source portrait picture to obtain a face region picture corresponding to a face of the target object excluding a hair portion;

input the face region picture to the picture generation model to obtain an output result of the picture generation model; and generate a target portrait picture by using the output result of the picture generation model, the target portrait picture displaying a target hairstyle matching the face of the target object.

16. The non-transitory storage medium according to claim 15, wherein, when the computer readable instructions cause the processor to input the face region picture to the picture generation model to obtain the output result of the picture generation model, the computer readable instructions cause the processor to:

extract, through an encoding module in the picture generation model, a facial feature corresponding to the face of the target object from the face region picture; and obtain, through a decoding module in the picture generation model, the target hairstyle matching the facial feature of the target object.

17. The non-transitory storage medium according to claim 16, wherein, when the computer readable instructions cause the processor to obtain, through the decoding module in the picture generation model, the target hairstyle matching the facial feature of the target object, the computer readable instructions cause the processor to:

determine a set of candidate hairstyles according to the facial feature of the target object; and obtain, from the set of candidate hairstyles, a hairstyle having a highest matching degree with the facial feature of the target object as the target hairstyle.

18. The non-transitory storage medium according to claim 16, wherein, when the computer readable instructions cause the processor to generate the target portrait picture by using the output result of the picture generation model, the computer readable instructions cause the processor to:

substitute an original hairstyle of the target object with the target hairstyle in the source portrait picture to generate the target portrait picture.

19. The non-transitory storage medium according to claim 15, wherein, when the computer readable instructions cause the processor to obtain the plurality of sample pictures, the computer readable instructions cause the processor to:

obtain a set of valid sample pictures matching a keyword from a network, the keyword being used for indicating a hot topic; and use valid sample pictures in the set of valid sample pictures as the plurality of sample pictures for training the adversarial neural network model.

20. The non-transitory storage medium according to claim 15, wherein, when the computer readable instructions cause the processor to train the determining network model in the adversarial neural network model, the computer readable instructions cause the processor to:

obtain a first sample source portrait picture displaying a first sample object; and perform following iteration:

crop the first sample source portrait picture to obtain a first sample face region picture corresponding to the face of the first sample object;

input the first sample face region picture to the generation network model to generate a first sample target portrait picture of the first sample object;

input a first sample pair comprising the first sample face region picture and the first sample source portrait picture and a second sample pair comprising the first sample face region picture and the first sample target portrait picture to the determining network model for training;

in response to the output result of the determining network model not converging, obtain a new sample source portrait picture displaying the first sample object to be used as the first sample source portrait picture and start over the iteration; and in response to the output result of the determining network model converging, obtain the converged determining network model and terminate the iteration.

* * * * *